Feb. 10, 1970  H. C. HARBERS, JR  3,494,609
LEAF SPRING AND AXLE SEATS
Filed Oct. 11, 1967
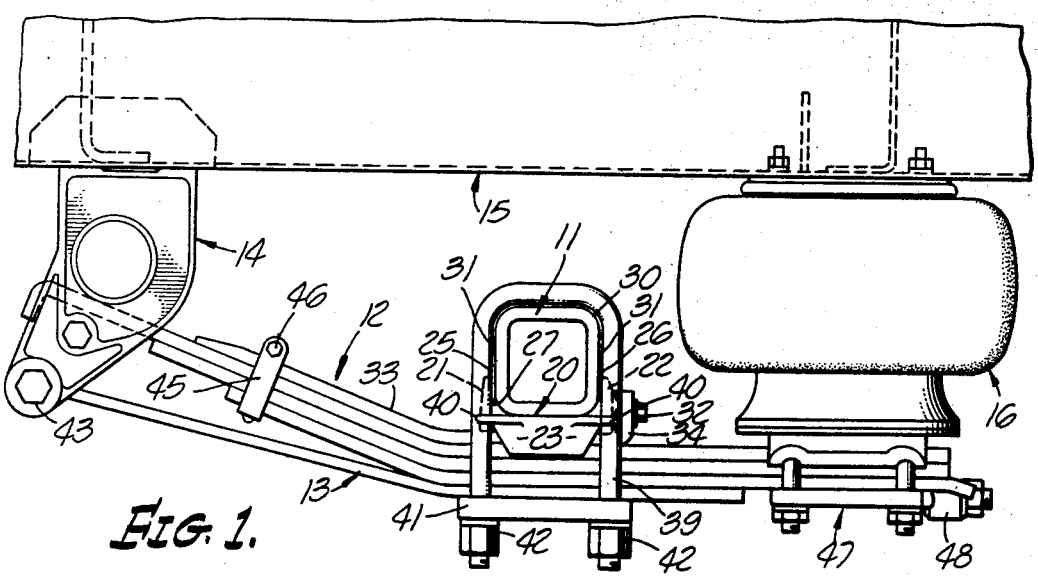
FIG. 1.
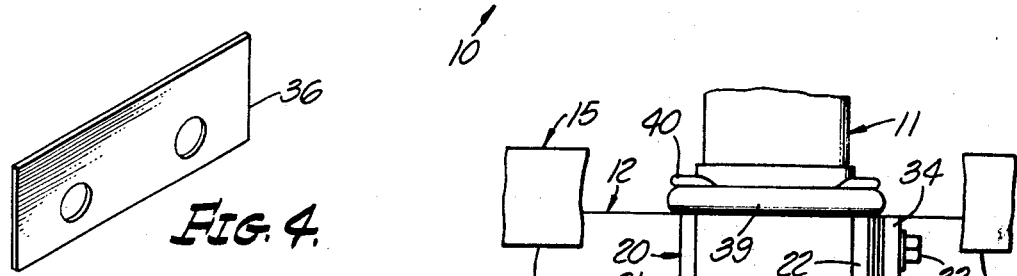
FIG. 4.   FIG. 2.
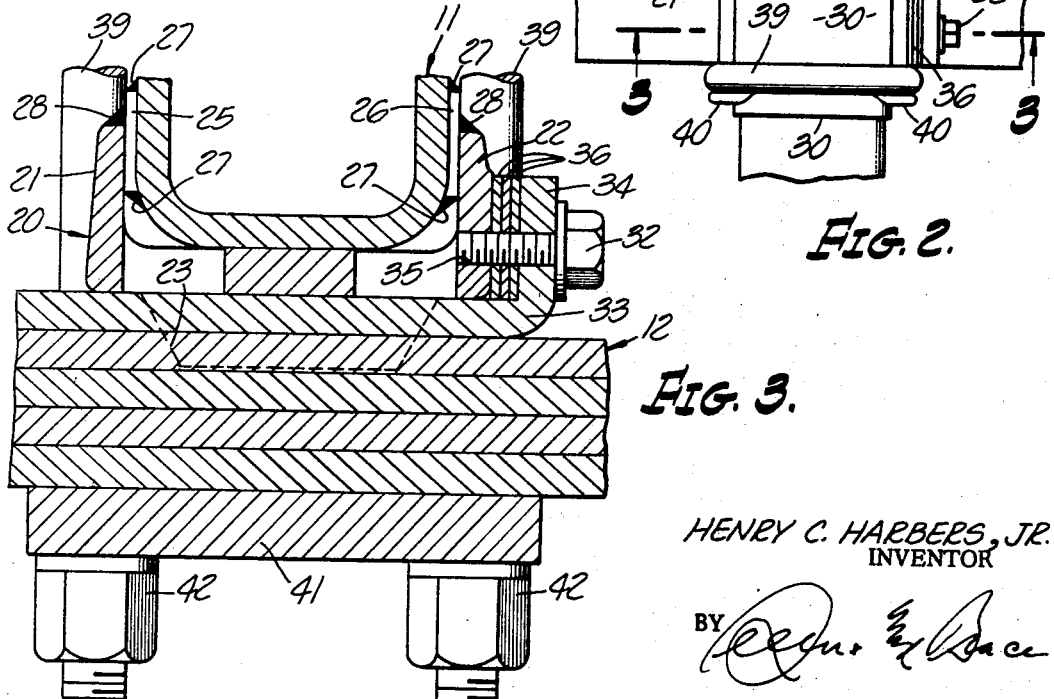
FIG. 3.
HENRY C. HARBERS, JR.
INVENTOR
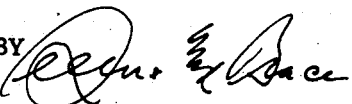
ATTORNEYS

United States Patent Office 3,494,609
Patented Feb. 10, 1970

3,494,609
LEAF SPRING AND AXLE SEATS
Henry C. Harbers, Jr., La Puente, Calif., assignor to Western Unit Corporation, City of Industry, Calif., a corporation of California
Filed Oct. 11, 1967, Ser. No. 674,510
Int. Cl. B60g 11/02; F16f 1/18
U.S. Cl. 267—52                                 9 Claims

ABSTRACT OF THE DISCLOSURE

A vehicle spring suspension assembly having simple means for rigidly anchoring a leaf spring unit rigidly to the carriage axle housing to eliminate the possibility of play between the axle housing and the spring unit. The anchor means comprises fastener means for securing one leaf of the spring unit to a spring seat embracing the axle housing and welded thereto.

---

This invention relates to vehicle spring suspension assemblies and featuring an improved coupling means for detachably anchoring a spring beam to the axle housing.

A popular type of vehicle suspension assembly employs a multiple leaf spring beam secured crosswise of the opposite ends of the carriage axle with at least the forward end coupled to the vehicle frame by suitable hanger means. The rearwardly projecting end of the spring may be similarly coupled to the frame or may include additional spring means such as an air spring. Such spring assemblies are coupled to the axle housing by various coupling constructions customarily employing a spring seat member interposed between the spring beam and the axle housing. This seat member is so contoured as to embrace adjacent portions of both the spring beam and the axle housing and preferably with sufficient snugness to avoid play and particularly relative rotary movement about a vertical axis passing through the axle housing and the seat member. Such play, if present in any degree, permits the carriage unit to shift back and forth laterally of the vehicle frame during travel along the highway in a movement known in this art as "dog tracking" and thereby augmenting the undersirable condition and leading to undesirable and hazardous operating conditions.

Numerous design expedients have been resorted to in attempts to avoid lost motion between the parts and the inevitable dog tracking which occurs if any relative motion is present.

Numerous attempts have been made to so design the spring seat as to eliminate lost motion but such attempts have not been successful owing to various factors including, in particular, tolerance variations between the contacting surfaces of the parts.

The foregoing and other disadvantages of prior spring suspension assemblies and the coupling means for holding the spring beam to the axle housing are avoided by the present invention utilizing an easily and economically manufactured spring seat member. If there is substantial space between the surfaces of the spring seat facing toward the axle housing, these are filled with a suitably shaped adapter or by one or more shim members which are welded to the axle housing following which the spring seat member is welded to the exterior of the shim. Additionally, the leaf of the spring beam adjacent the seat member is provided with an upright hooked end positioned closely beside the rearwardly facing edge of the spring seat member and rigidly secured thereto, as by threaded fasteners. Before making this last mentioned connection, adjustable shim means may be inserted between the hooked spring end and the seat member to assure proper alignment of the axle housing with the vehicle frame. The usual clamping members are then employed to clamp the spring beam rigidly and immovably to the axle housing and the forward end of the spring beam and any associated draft transmitting member is secured to a forwardly positioned hanger bracket in any suitable manner. Desirably, the spring beam unit includes one or more fasteners embracing the spring beam to one or both sides of the axle housing thereby preventing lateral movement of the spring leaves relative to one another and holding all the leaves firmly and immovably aligned with the spring leaf anchored to the spring seat member.

Accordingly it is a primary object of the present invention to provide an improved coupling assembly for holding the spring beam of a suspension assembly rigidly secured to an axle housing.

Another object of the invention is the provision of a simple, inexpensive, and reliable manner of coupling the spring beam of a suspension assembly to an axle housing without possibility of lateral movement of the spring relative to the axle housing thereby to minimize if not eliminate dog tracking.

Another object of the invention is the provision of a spring suspension assembly for a vehicle utilizing a multiple leaf spring beam having its forward end operatively connected to a hanger bracket with the leaf closest to the axle housing provided with a hooked end lying generally upright along the rear face of the axle housing and immovably anchored to the axle housing and rigidly clamped to the remainder of the spring beam.

Another object of the invention is the provision of means for rigidly anchoring a spring beam to an axle housing and including a spring seat member immovably bolted to a part of the spring beam and welded directly to the axle housing or indirectly through adapter shim means welded to the axle housing.

These and other more specific objects will appear upon reading the following specification and claims and upon considering in connection therewith the attached drawing to which they relate.

Referring now to the drawing in which a preferred embodiment of the invention is illustrated.

FIGURE 1 is a fragmentary side elevational view of an illustrative embodiment of a suspension assembly incorporating the principles of the present invention;

FIGURE 2 is a fragmentary top plan view with parts broken away showing the coupling means securing the spring beam to the axle housing;

FIGURE 3 is an enlarged sectional view taken along line 3—3 on FIGURE 2; and

FIGURE 4 is a perspective view of one of the shim components.

Referring more particularly initially to FIGURE 1 there is shown one preferred embodiment of the invention spring suspension assembly designated generally 10. This suspension includes, as principal components, an axle housing 11, and a leaf spring unit 12, including a draft transmitting member 13 operatively coupled at its forward end to a hanger bracket 14 welded to or otherwise secured to the main frame 15 of a vehicle. The rear end of spring beam 12 is here shown as supporting and clamped in conventional manner to the lower end of an air spring 16 interposed between the spring beam and the chassis frame.

The coupling connecting the spring beam immovably to axle housing 11 comprises a cast spring seat member 20. This member comprises a pair of upright flanges 21, 22 projecting upwardly from its midportion or main body and spaced to lie closely against either the forward and rear faces of axle housing or against shim means. A similar pair of flanges 23 project downwardly from the main body portion of seat 20 and are spaced to lie closely against the opposite lateral sides of spring beam 12. Accordingly flanges 23 project oppositely to flanges 21, 22 and lie in planes at right angles to flanges 21, 22. It is pointed out that the interior side walls of flanges 23, 23 lie parallel to one another and have a snug press fit with the opposite lateral edges of the upper leaves of spring beam 12.

Desirably, the interior faces of the upright flanges 21, 22 also should have a snug fit with the adjacent faces of the axle housing. In actual practice, however, tolerance variations are sufficiently great that there may be a considerable gap between the facing surfaces. If the fit is reasonably snug then it is feasible to weld the upper edges of flanges 21 and 22 rigidly and directly to the axle housing. In other cases the spacing is sufficiently great that it is preferable to insert shims of appropriate thickness, such as shims 25, 26 having the requisite thickness to provide a reasonably snug fit between flanges 21, 22 and the adjacent side walls of the axle housing. These are firmly welded to the axle housing by welds 27 extending lengthwise along both their upper and lower edges. Thereafter flanges 21, 22 of the spring seat are pressed into assembled position and welded at 28 to the shims.

In other cases the axle housing is round or otherwise contoured differently from the seating surface provided in member 20. In these cases an adapter is employed having an exterior surface complemental to that of the spring seating member and an interior surface contoured to fit against the adjacent face of the housing. Such an adapter may be described as generally C-shaped and seats snugly between seat member 20 and the axle housing. However, before assembly to the seat member, the adapter is welded to the axle housing.

Referring to FIGURE 1 it is pointed out that, when using shims or adapters, it is important to use a C-shaped shim 30 having the same thickness as shims 25, 26 between the upper half of the axle housing and the U-bolt clamps, its lower edges being welded to the housing as indicated at 31 in FIGURE 1.

A further and important feature of the invention resides in the means provided for positively and immovably securing one leaf of the spring beam 12 to the spring seat 20. The spring beam may extend crosswise of either the upper or the lower side of the axle housing; in the latter mode, the upper leaf 33 of the spring unit is provided with an upturned or hooked end 34 positioned closely beside the rear transverse edge of the spring seat member. Suitable means, such as a pair of cap screws 32 extend through holes provided in hooked end 34 and into threaded bores 35 formed in the rear transverse edge of spring seat 20.

Proper alignment of the carriage axle with the longitudinal axis of the chassis frame 15 is conveniently attained, according to this invention, by the use of one or more shim members 36 (FIGURE 4) inserted between seat member 20 and hooked end 34. These may be of varying thickness to facilitate obtaining a desired proper adjustment and are then rigidly clamped in place by cap screws 32.

The coupling of the spring beam to the axle housing is completed by the use of suitable clamping means such as a pair of conventional U-bolts 39. These bolts straddle the axle housing and are forced to lie snugly against the opposite sides of the spring beam by positioning ears 40, 40 cast integral with seat member 20. The entire assembly, including a keeper or pressure plate 41 has holes to receive the threaded ends of the U-bolts, is clamped rigidly to the axle housing by means of nuts 42. Prior to tightening these nuts, draft member 13 is preferably secured to hanger member 14 by through bolt 43. Once this member has been rigidly secured and a check has been made to determine that the axle housing is properly aligned with the axis of the chassis frame, nuts 42 are tightened to a prescribed torque value thereby assuring that all parts of the coupling are rigidly and immovably secured together and to the axle housing.

Providing further assurance against relative lateral movement between the individual leaves of spring beam 12 is a U-shaped clip 45 snugly embracing the forward ends of the spring leaves and held in place by a bolt 46. Additionally aiding in anchoring the leaves against relative lateral movement is the clamping means serving to hold air spring 16 clamped to the rear end of the spring beam. This clamp usually includes an anchorage 48 for the lower end of sidewise snubber or stabilizer means, not shown, but well known to those skilled in this art and customarily present in spring suspension assemblies employing air springs.

While the particular spring suspension assembly for vehicles herein shown and disclosed in detail is fully capable of attaining the objects and providing the advantages hereinbefore stated, it is to be understood that it is merely illustrative of the presently preferred embodiments of the invention.

I claim:

1. That improvement in vehicle spring suspension assemblies utilizing spring beams between the vehicle frame and the carriage axle unit, which improvement comprises: coupling means for rigidly connecting the spring beam to the axle unit, said coupling means including a spring seat member having one face shaped to embrace the juxtaposed portion of the axle unit and its opposite face positioned to bear against one generally horizontally disposed surface of the spring beam, means securing said spring seat member immovably to said carriage axle unit, the end of said spring beam including a spring component thereof in contact with said spring seat member bent away from the adjacent portion of the spring beam along the rearwardly facing end of said seat member, means for securing said upright spring end rigidly to the rear edge of said seat member, and means for rigidly securing said seat member sandwiched between said spring beam and said carriage axle unit.

2. That improvement defined in claim 1 characterized in that said means for securing said upright spring end to the rear end of said spring seat member comprises cap screw means extending through the upright end of said spring and into threaded bore means formed in the rear edge of said seat member.

3. That improvement defined in claim 2 characterized in the provision of shim means between said upright spring end and the rear edge of said seat member, said shim means being adjustable in thickness and effective when adjusted to compensate for manufacturing tolerance variations and permit the axle unit to be positioned to lie at right angles to the longitudinal center line of a vehicle to which said suspension assembly is connected.

4. In a coupling assembly for use in clamping a spring beam assembly to a vehicle carriage axle unit generally square in cross-section, said spring beam extending crosswise of one horizontal side of said axle unit and having the rearward end of the leaf adjacent the axle unit turned upright crosswise of a portion of the rear side of said axle unit, U-bolt clamping means for clamping said spring beam assembly rigidly to said axle unit; that improvement which comprises: a spring seat member shaped to provide oppositely facing first and second channels on the opposite sides of a common web portion and with the length of said channels lying at right angles to one another, said first channel being sized to seat and snugly embrace said spring beam assembly transversely thereof and said second channel embracing said axle unit closely forwardly of the forward face of the upright end of said outer spring leaf, said spring seat member being insertable between said axle unit and said spring beam assembly prior to the assembly and tightening of said U-bolt clamping means, and fastener means for rigidly clamping the upright end of said outer spring leaf to the rearward exterior side of the second channel of said spring seat member.

5. A spring suspension assembly for a vehicle of the type having a main frame provided with a spring hanger, a leaf spring unit including draft means extending lengthwise of said main frame and having its forward end operatively connected to said spring hanger, a carriage axle housing extending crosswise of said main frame and of said leaf spring unit, spring seat means interposed between said leaf spring unit and said axle housing and welded rigidly to the latter, the spring leaf bearing against said spring seat means having a hooked end extending generally vertically along the rearwardly facing edge of said spring seat means, fastener means detachably anchoring said hooked end to said spring seat means, and clamping means embracing said axle housing, said seat means and said leaf spring unit effective to clamp these components immovably together.

6. A spring suspension assembly as defined in claim 5 characterized in that spring seat means includes shim means between the rear edge of said spring seat member and the spring leaf having a hooked end, said shim means being adjustable to facilitate aligning said axle housing crosswise of the length of said main frame.

7. A spring suspension assembly as defined in claim 5 characterized in that said spring seat means includes shim means welded to said axle housing and to the juxtaposed surfaces of a spring seat member in direct contact with and astride said spring unit.

8. A spring suspension assembly as defined in claim 5 characterized in that said leaf spring unit projects rearwardly beyond said axle housing, and air spring means having one end rigidly connected to the rearwardly projecting end of said leaf spring unit and its other end rigidly connected to said main frame.

9. A spring suspension assembly as defined in claim 8 characterized in the provision of means embracing said leaf spring unit to either side of said axle housing and cooperating with said clamping means to hold the individual spring leaves thereof aligned with one another.

References Cited

UNITED STATES PATENTS 2,745,661  5/1956  Van Raden _____ 267—52
3,237,957  3/1966  Harbers _____ 280—124 X A. HARRY LEVY, Primary Examiner U.S. Cl. X.R.

280—124